Jan. 12, 1960 J. W. ANDERSON 2,920,336
WINDSHIELD WIPER BLADE ASSEMBLY
Filed Sept. 11, 1958 2 Sheets-Sheet 1

INVENTOR.
JOHN W. ANDERSON
BY W. E. Recktenwald
A. D. McFadyen
C. S. Penfield
ATTORNEY Jan. 12, 1960  J. W. ANDERSON  2,920,336
WINDSHIELD WIPER BLADE ASSEMBLY
Filed Sept. 11, 1958  2 Sheets-Sheet 2

INVENTOR.
JOHN W. ANDERSON
BY W. E. Recktenwald
 A. O. McFadyen
 C. S. Penfold
ATTORNEY

United States Patent Office 2,920,336
Patented Jan. 12, 1960

2,920,336

WINDSHIELD WIPER BLADE ASSEMBLY

John W. Anderson, Gary, Ind.

Application September 11, 1958, Serial No. 760,391

9 Claims. (Cl. 15—245)

This invention relates to windshield wiper blades and pressure-applying assemblies therefor adapted to wipe in an improved manner curved and "wrap-around" windshields, and to wipe likewise so-called flat windshields which are not truly flat but have at their surfaces irregularities making it difficult to wipe them uniformly with the conventional blade having the rubber wiping element mounted in a rigid channel. (See column 1, line 44, through column 2, line 18, of U.S. Patent No. 2,659,923.)

In addition to the problems of wiping irregularities in the surface of a flat windshield and moderately curved windshields, the modern type of sharply curved "wrap-around" windshield, now original equipment on most new automobiles, has intensified the problem of so applying pressure to the blade as to cause the blade to remain throughout its length in effective wiping contact with the glass as it travels across a predetermined area of the windshield. Such wrap-around windshields have given rise to serious difficulties encountered in holding the outer end of the blade in effective wiping contact with the glass as it enters the outer limit of its stroke, where the most abrupt curvature of the windshield is encountered.

Various devices have been employed without success to solve this problem. Among these devices are some which have modified as to detail, without departing from the broad and novel concept, the construction shown and claimed, for examples, in my U.S. Patent No. 2,596,063, issued May 6, 1952, and in my Patent No. 2,782,448, issued February 26, 1957.

Many modifications of my patented construction often have fallen short of the desirable result above described and because of such modifications have introduced one or another new problem relating to holding the wiping edge of the blade, throughout its length, in effective wiping contact against the glass. Thereby undesirable performance characteristics are encountered in circumstances and conditions frequently found in highway travel—including various intensities and directions of air currents, and variations in their angle of impact against the windshield and the wiper blade, such air currents frequently being composites of natural wind and of currents generated by the movement of the vehicles.

One of the problems encountered in attempts to improve effectiveness of wiping contact has been to so divide and distribute, throughout the length of the blade, the pressure applied by the wiper arm, as to assure that the outer end of the blade will have maximum ability to conform to the outer and sharper curvatures of the windshield, while holding the blade in effective contact also throughout all its other portions. The subject invention solves this problem by applying to the blade at predetermined points thereon such portions of the total of the arm pressure as may be determined to be desirable and by precurving the blade convexly to provide, against the windshield, throughout the length of the blade, a distribution of pressure predetermined as desirable.

Another serious problem encountered in wiping windshields is chattering of the blade as it encounters areas of varying degrees of frictional resistance in moving across the glass, particularly when the glass is in what is known as "wet-dry" or "tacky" condition, as when precipitation affects the friction of the glass irregularly, as by drops of water spaced apart. Under such "wet-dry" conditions a wiper blade often jumps, squeaks, and chatters in its contact with the glass, producing ridges of water obstructive to vision.

As I discovered in my development of the wiper blade shown in my U.S. Patent No. 2,596,063, above mentioned, and as shown also in others of my later patents, there must be provided, remote from the extremities of the blade, abutments to resist both lateral and torsional flexing of the blade. Among the means by which these two results were achieved in my U.S. Patent No. 2,596,063, above mentioned, is the slidable, flexor-embracing abutment means shown in Figure 11 of said patent and described in column 6, lines 25 to 33, inclusive, thereof.

As far as is known, similar construction for providing abutment means against lateral and torsional flexure, and against resultant vibration and chatter, is incorporated generally in windshield wiper blades for curved windshields being manufactured and used at the present time, whether in the United States or in foreign countries. Thus the importance of employing such sliding abutment means—serving (1) to limit lateral flexing or chatter of the blade, and (2) to limit torsional deflection and distortion of the blade—has been widely recognized in the general type of blade to which the subject invention relates.

Heretofore, these sliding, embracing abutments have also been employed to transmit, to the wiper and flexor assembly, some substantial portion of the pressure transmitted to the blade from the wiper arm. However, it has been determined that, while such abutment means, disposed remote from the ends of the blade, are essential in some effective form to the satisfactory operation of the blade, attempts to use these same means also to transmit arm pressure to a point on the blade remote from its ends produces thereat, due in part to resultant excess friction between the parts, a localized irregularity in pressure on the blade that results under some operating conditions in less than the most effective conformation of the blade assembly to the varying curvatures of the surface of the windshield to be wiped than that obtained by the unique combination of functional parts of the subject invention.

In view of the problems here discussed, the present invention contemplates the provision of structure adapted to stabilize the blade against lateral and torsional deflection, while being completely free, except for a negligible minimum of incidental friction, to move in a plane substantially perpendicular to the windshield. Thus, while the abutments of the prior art stabilize the blade and at the same time transmit pressure thereto, the structure of the present invention, while stabilizing the blade, does not transmit pressure to the latter, but floats freely and reversely in said plane.

While the prior art provides for abutment claws or embracing slides, the structure of the present invention provides, with said claws or slides, additional structure carrying the claws and co-operating with, and disposed between, a pressure-transmitting member and the blade. Such additional structure may constitute links joining the pressure-transmitting member and the blade and arranged to pivot and/or slide with respect to either. My invention in its preferred form thus provides pivoting and/or sliding stabilizing links, substantially friction-free, having portions embracing and abutting the outer edges of the flexor and also a portion of the top and bottom faces thereof. Consequently, the problems of providing the abutment means necessary, for reasons described are met satisfactorily without interference with my improved distribution of pressure from the wiper arm through the wiping edge of the blade to the windshield.

Thus, according to the present invention, the blade is carried by an arm-pressure-transmitting means together with partially floating stabilizing means operatively connected with the pressure-transmitting means and with the blade, and being free to move, with relation thereto, in a plane substantially perpendicular to the windshield, responsive to movements of the blade with relation to the pressure-transmitting means.

While the stabilizing means herein shown is particularly advantageous with the blade, pressure-applying means, and precurved blade structure herein shown, it is to be understood that the inventive concept residing in the use and application of the free-floating stabilizing means employed in the subject invention is readily applicable to a windshield wiper in which a medial portion of the blade is of sufficient length, in itself, to make stabilization against chattering and torsional distortion desirable, in forms other than the form herein specifically illustrated. In blades of extreme length it may be desirable to introduce secondary yokes providing one pressure point against the blade adjacent each of the blade extremities with the opposite pressure point of each individual yoke disposed somewhat remote from the extremity of the blade, thus leaving an intermediate span or spans of blade of sufficient length to utilize to advantage stabilizers such as herein shown and claimed. In other words, the inventive concept reflected in the use of such stabilizers is not limited to any particular pressure-applying structure but is useful wherever there exists a medial portion of the blade which requires stabilization.

A measure of the improved performance thus achieved may be obtained with structure embodying deviations from the preferred form and functions disclosed herein, such, for example, as connecting the stabilizer links with the rubber element of the blade without direct connection to the flexor. However, in the preferred form of the subject invention, as explained above, this result is obtained by a simple sliding, flexor-embracing formation carried by an end of the link (or stabilizer).

One of the advantages of the subject invention is that it permits, throughout the length of the blade, attainment, within practical limits, of substantially any distribution of pressure which may be predetermined as desirable. This is accomplished by means of varying the degree of precurvature of portions of the flexor in a direction toward the windshield, so that predetermined portions of the total arm pressure will be effectively applied with relation to medial portions of the blade, with remaining portions of the arm pressure producing effective contact of the blade against the glass at an adjacent its extremities. Because in the subject invention there is no arm pressure applied against the blade except at or adjacent its extremities, the blade is left free to assert reactive pressure caused by its precurvature and thus to seek and reach, throughout its length, its own full contact with the windshield, as it traverses the constantly changing curvatures of the windshield—without such localized areas of irregular pressure as is created by the use of spring-urged independently pivoted pressure-distributing points remote from the ends of the blade.

Summarizing, the construction and arrangement of the invention shown and claimed in my Patent No. 2,596,063 meets fully and satisfactorily the requirements of wiping more effectively the so-called curved windshields incorporated in new cars before the advent, a few years ago, of the more sharply curved wrap-around windshield. The wrap-around windshield has introduced a new problem solved herein by limiting the application of arm pressure to points on or adjacent the extremities of the blade, with the blade convexly precurved as herein shown—in order to provide a predetermined division of that pressure across portions of the blade between the two extremities. In a preferred form, this is achieved by a pressure-transmitting member operatively connected to or adjacent each such extremity with a convexly precurved blade stabilized for relative movement in a single plane substantially normal to the windshield and free of limitations or impediments imposed by intermediately interposed pressure-transmitting and/or applying structure which when present creates consequent added frictional resistance, and pressure irregularities caused by such resistance and by variations in relative angularity of applications of arm pressure by auxiliary members receiving and applying subdivisional portions of such arm pressure.

While contemplating structure capable of improved performance under changed conditions described as encountered in wiping wrap-around windshields, it perhaps should be pointed out that the subject invention constitutes a furtherance of the concept of the invention claimed in my U.S. Patent No. 2,596,063, and lies within the scope of that invention, as claimed therein.

For lack of a blade with the improved performance characteristics hereinabove described and hereinafter claimed, it has been necessary for engineers for car manufacturers to terminate the outer movement of the blade at a point in the arc which would prevent irregular and damaging results such as often follow any attempt to project the travel of the blade farther down and around the sharper curvature of the windshield toward its lateral extremities. Thus has been left, of necessity, at each side of the windshield, an unwiped or inadequately wiped area which has produced an undesirable restriction of lateral vision for the driver. The subject invention permits the desirable, but heretofore not attainable, extension of the wipe farther toward the lateral extremities of the windshield with more satisfactory results than it has been possible heretofore to achieve in wiping wrap-around windshields.

This novel construction and arrangement of parts of a windshield wiper has produced surprisingly superior results on wrap-around windshields—particularly in the matter of maintaining the entire length of the wiper element of the blade in more effective contact with the glass throughout the entire area to be wiped.

The foregoing and other objects and advantages will manifest themselves as this description progresses, reference being made therein to the accompanying drawings, wherein:

(Figure 2 shows said blade held restrained in the full assembly, as herein explained.)

Figure 1:
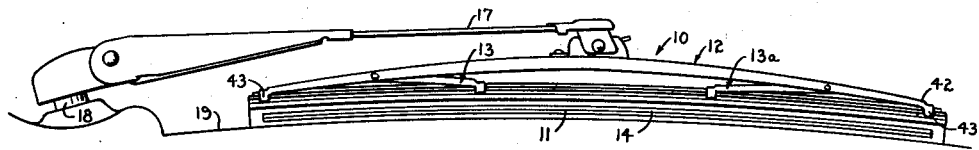
Figure 1 is a side view in elevation of a preferred form of my improved windshield wiper blade assembly as applied to a windshield.

Referring more particularly to the drawings wherein identical numerals indicate identical parts or assemblies, the windshield wiper blade assembly 10 illustrated in Figure 1 comprises a wiper means or blade 11, a pressure-transmitting or pressure-applying means 12 and stabilizing means 13 and 13a. The wiper means or blade comprises a rubber-like resilient wiping element 14, or the like, and a supporting structure therefor including a backing strip or flexor 15. The pressure-transmitting means is attachable to the outer end portion of the inwardly spring-biased wiper arm 17 which in turn is fastened on an oscillating shaft 18 for being moved back and forth over the windshield surface 19.

Figure 7:
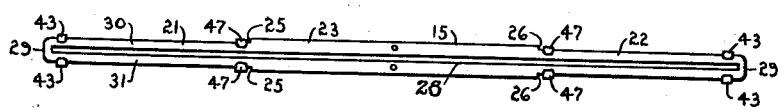
Figure 7 is a bottom view of the backing strip or flexor of Figure 1 together with the under-engaging sliding claws at the ends of the pressure-transmitting means and stabilizing links.

The flexor 15 of the blade, for the purpose of illustration and not for limitation, is elongated and preferably made of metal of uniform thickness—preferably, but not necessarily, with corresponding reduced end portions 21 and 22 and an intermediate or central portion 23 of a greater width than the end portions. This variation in width forms shoulders which provide longitudinally spaced abutment means 25 and 26, whereby to prevent excessive longitudinal movement of the blade with relation to the pressure-applying means. The flexor is preferably provided, as shown in Figure 7, with an elongated narrow slot 28 terminating short of the ends of the support to provide connecting or spring-hinged portions 29 whereby longitudinal parallel side portions 30 and 31 of the support can be spread apart to enlarge the size of the slot so that the resilient wiper element 14 can be inserted therein, after which the longitudinal portions 30 and 31 are released to cause such portions to interlock with the resilient wiper element whereby to hold the two in coactive relationship. As is shown in dotted lines in Figure 8, the wiper means or blade 11 through the action of the backing strip or flexor 15 has a curvature in a direction toward the windshield. For a purpose to be described more fully hereinafter, the degree and character of precurvature in the direction of the windshield can be varied depending upon the results sought to be obtained.

Figure 6:
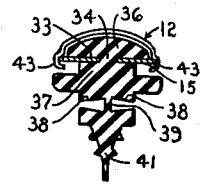
Figure 6 is a cross-sectional view taken along the lines 6—6 of Figure 3.

The resilient wiper element 14 is preferably formed in one piece with opposed longitudinally extending exterior grooves 33 therein to provide a neck 34. The grooves 33 receive the inner marginal edge portions of the longitudinal portions 30 and 31 of the flexor 15 with the neck 34 between such portions so that the upper portion 36 and lower portion 37 of the element 14 engage the upper and lower surfaces of the support, as shown in Figure 6. The element is further formed with a second pair of opposed longitudinally extending exterior grooves 38 to provide a hinge 39 to permit a controlled pivotal movement of the wiping edge 41 having wiper edges thereon as shown. The depth of these grooves 38 may be varied throughout and/or adjacent portions thereof, from zero depth to the maximum depth employed, to protect the rubber element from excessive bending or layover, for example as the blade encounters the sharper curvatures of the windshield, particularly adjacent the outer extremities of the wiped area of a wraparound windshield.

Figure 5:
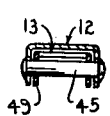
Figure 5 is a cross-sectional view taken along the line 5—5 of Figure 3.

The pressure-transmitting means 12 is composed of an elongated arcuately curved member preferably channeled, and preferably formed of metal and having its respective end portions 42 arcuately curved in cross section and formed with spaced-apart claws 43 which are shaped to slidingly embrace the longitudinally extending edge portions of the sides 30 and 31 of the flexor 15 near the opposite extremities of the wiping element. The claws 43 embrace the edges of the flexor in such a way that portions of the claws overhang both the top and bottom surfaces of the flexor so as to permit only limited upward and downward movement of the flexor relative to the claws. As shown in Figure 5, the channel-shaped member of the pressure-transmitting means is substantially rectangular in cross section although the cross-sectional shape of the member is not considered to be a critical part of the structure.

The stabilizing links 13 and 13a are pivotally mounted about pins 45 at an appropriate distance inwardly from the end portions 42 of the pressure-transmitting member 12 and extend inwardly from said pressure-transmitting member 12 toward the central portion of the blade. These links may be identical in form and shape, and reversible as to position. Each link 13 and 13a has an end portion 46 formed with spaced-apart inwardly directed claws 47 which are shaped to slidingly embrace the longitudinally extending edges of the reduced end portions 21, 22 of the flexor 15 in the general vicinity of the abutment shoulders 25, 26 on the flexor and normally spaced a distance therefrom predetermined to prevent "jamming" the assembly. Links 13 and 13a have downwardly directed sides 49 which, at the pivoted end portion, receive therethrough the pins 45. The sides 49 of the links 13 and 13a are extended beyond the center of the pivot pin to form a pair of stop members 50 which are adapted to engage the undersurface of the pressure-transmitting means 12 so as to limit the amount of pivotal movement of the links 13 and 13a about the pins 45 in the direction of the windshield, thus to restrict the bowing outwardly of the flexor 15. The links 13 and 13a are of the same general shape in cross section as the pressure-transmitting means 12, except that the links are smaller so as to be adapted to nest readily within the confines of the pressure-transmitting means in varying degrees depending upon the degree of curvature of the windshield surface being wiped. Links 13 and 13a are carried by the pressure-transmitting means in such a manner that each link is permitted to move only in a plane substantially perpendicular to the surface of the windshield being wiped, which plane can also be defined as the plane containing the longitudinal axes of the pressure-transmitting means and the blade, a characteristic inherent in the construction shown. The claws 47 on the stabilizer links 13 and 13a are adapted to be movably disposed on the flexor 15 in relatively close proximity to the abutments 25, 26 on said flexor 15 so as to abut said abutments, whereby to limit longitudinal movement of the flexor and blade relative to said pressure-transmitting means 12.

Figure 8:
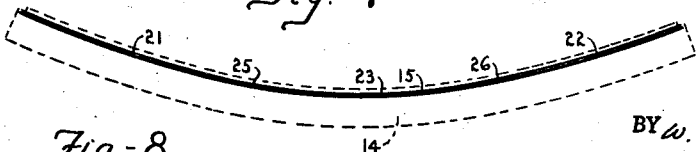
Figure 8 shows the backing strip (or "flexor") and wiping element, constituting the blade, bowed outward normally as when in generally preferred unrestrained formation.

As best shown in Figure 8, the rubber wiping element 14, shown in dotted lines, is given an initial substantial precurvature in the direction of the windshield by means of a substantial predetermined precurvature in the flexor 15 which coacts therewith. The flexor, which is formed preferably of metal, may have its precurvature predetermined in the shape of a generated curve which is not truly an arc of a circle.

The unrestrained flexor and rubber assembly (the blade) assumes a curvature predetermined, with relation to dimensions and materials employed in components, to produce, under pressure of the arm, the desired distribution of that pressure on the windshield throughout the length of the blade. By way of example but not by limitation, the preferred form of curvature may be generally parabolic in shape. The result is a flexor that has end portions moderately curved and, by comparison, a central portion being, in part, more sharply curved.

Figure 2:
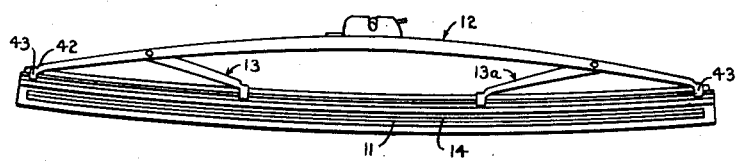
Figure 2 is a side view in elevation of the full assembly of Figure 1, removed from the windshield.
Figure 3:
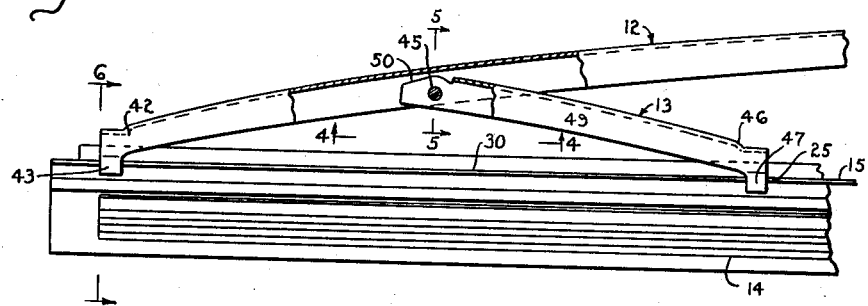
Figure 3 is an enlarged view of the left-hand portion of the full assembly of Figure 1, with portions cut away to show how the stabilizing links prevent excessive "bowing out" of the blade.
Figure 4:
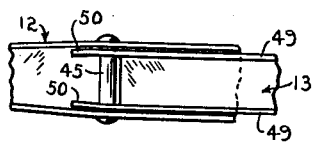
Figure 4 is a view taken in the direction of the arrows 4—4 of Figure 3.

When the blade (wiping element 14 and flexor 15) of Figure 8 is installed with the pressure-applying means 12 and stabilizing links 13 and 13a, the stops 50 on the links engage the pressure-transmitting means to cause the wiping element and flexor to be restrained so as to restrict the curvature of the blade to that shown in Figure 2. This limits foreshortening of the flexor, to prevent undesirable separation of the blade from the outer ends of the pressure-transmitting member, and facilities handling and packing of the blade assembly for shipment. The flexor 15 is still precurved and is attempting to return to its maximum or normal curved condition, as shown in Figure 8, with a substantial predetermined limitation of the precurving being provided by the stops 50 on the links 13 and 13a when the wiping element is not in contact with a surface.

By using a flexor having a generated curvature of the general type just described, in conjunction with a wiping element 14, and constituting a blade with a pressure-transmitting means which applies arm pressure to the flexor at or adjacent the outer end portions of the blade, the pressure from the wiper arm first urges the central and intervening portions of the blade, and then the end portions of the blade, into substantially complete surface-conforming relationship with the windshield or other surface to be wiped. As the pressure from the wiper arm urges the wiped blade against the windshield, the flexor assumes a shape that produces the maximum efficiency in conforming the wiping element to the surface being wiped. That is, with a predetermined amount of pressure applied by the pressure-transmitting means 12 to the longitudinally spaced-apart end portions of the appropriately preshaped flexor 15 and wiping element 14, the wiping edge 41 of the blade is forced throughout its length into effective conformance with the surface of the windshield. The pressure applied at the end portions of the flexor is distributed substantially along the length of the blade by the resistance of the precurvature of the flexor as the wiper element is brought to bear against the surface of the windshield. The precurvature of the flexor and wiping element urges the wiping edge of the wiping element from the center toward each end more satisfactorily into surface depressions and irregularities on the windshield.

Since the links 13, 13a are permitted to move relative to the pressure means 12 only in a plane substantially perpendicular to the surface being wiped, and since the claws 47 on the one end of each link slidingly embrace the opposite edges of the flexor 15, it is readily apparent that the links serve to stabilize the blade against lateral vibration and chatter, and against torsional deformation and distortion. The claws 47 on the ends of the stabilizing links 13 and 13a and the claws 43 on the ends of the pressure-transmitting means 12 embrace the longitudinal edges of the flexor at a plurality of longitudinally spaced-apart points so as to substantially support the flat portion of the flexor in a plane substantially parallel to the surface of the windshield. Since the claws 43 and 47 are adapted to engage both top and bottom surfaces of the edge portions of the flexors, said claws serve to limit the movement of the flexor relative to links 13 and 13a and pressure-transmitting means 12. In this way, the flexor is substantially supported against torsional deformation and distortion and, when assembled in combination with the wiping element 14, the resulting blade is substantially supported also against lateral vibration and chatter.

Figure 9:
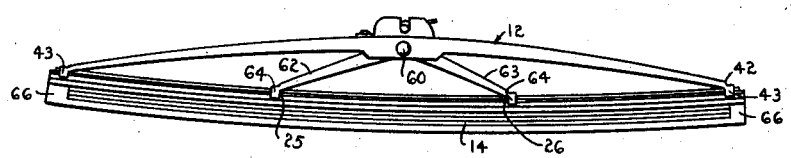
Figure 9 is a side view of a modified form of my invention showing the stabilizing links pivoted in the center portion of the pressure-transmitting means and extending in substantially diverging directions toward the intermediate portions of the blade.
Figure 10:
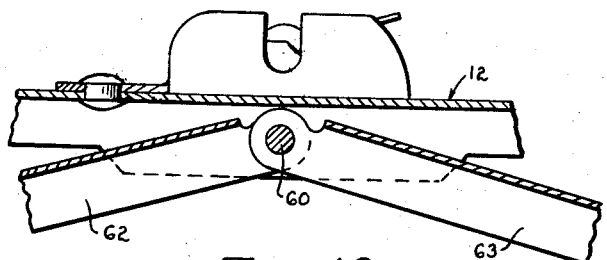
Figure 10 is an enlarged view of a cutaway portion of the central part of the assembly of Figure 9 showing the details of the pivot on the ends of the stabilizing links.
Figure 11:
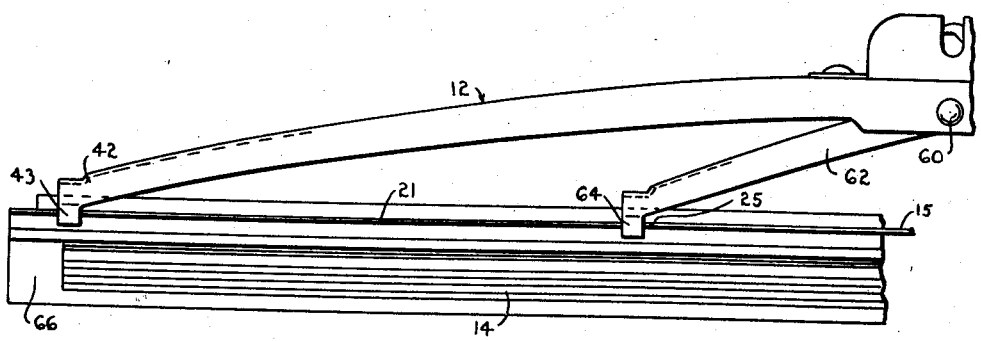
Figure 11 is a partial enlarged side view of the lefthand end of the assembly of Figure 9 showing the details of the rubber element and flexor with respect to the pressure-transmitting means.

The modified form of my invention shown in Figures 9, 10, and 11 has essentially the same blade structure as Figures 1-8 which comprises a resilient wiping element 14 and a flexible backing strip or flexor 15. The flexor 15 is shaped in the direction of the windshield in a predetermined manner as shown and described with respect to Figures 1-8. The pressure-transmitting means 12 is adapted to be attached at its central portion to the end of the wiper arm and at its end portions to the blade. The attachment of the pressure-transmitting means 12 to the blade is effected by means of claws 43 on the ends thereof which slidably embrace the edge portions of the flexor 15 at or adjacent the outer end portions of the blade. It is to be understood that any appropriate means for attaching the pressure-transmitting means 12 to the blade is within the scope of the invention.

The modified construction comprises a pivot 60 passing through and fastened to the downturned sides of the central portion of the pressure-transmitting means 12 in relatively close proximity with respect to the connector on the pressure-transmitting means. A pair of stabilizing links 62, 63 are each pivoted at one end portion to said pivot 60 and extend in substantially diverging directions toward longitudinally spaced points on the blade. The other end portion of each link 62, 63 has a pair of claws 64 which slidingly embrace the opposite edge portions of the end portions 21, 22 of the flexor 15. The links 62, 63 are carried on the pressure-transmitting means in such a way that they are permitted to move only in a plane substantially perpendicular to the surface of the windshield.

With the blade assembled with the pressure-transmitting means and stabilizing links 62, 63 as shown in Figure 9, the claws 64 on the links abut the abutments 25, 26 on the flexor 15 when the blade assembly is lifted from the surface of the windshield or the like. Due to the just-described abutting contact, the precurvature of the blade toward the windshield appears to be of a limited scope when in fact the precurvature is present in the blade and is serving to load the stabilizing links 62, 63 when the blade is not contacting, under arm pressure, the surface to be wiped.

As shown in Figure 11, the resilient wiping element 14, which is formed preferably of rubber or rubberlike material, has its end portions thickened as at 66. The thickening also fills in the end portions of the grooves in the sides of the wiping element 14 to stiffen and add body to the wiping element near the ends thereof. The stiffening of the appropriate parts of the wiping element is optional in either form of my invention and, when it is desired to have stiffened portions, various stiffening constructions and arrangements can be employed within the concept of my invention.

With the structure herein described with respect to both modifications of my assembly, under certain conditions it is possible to have a substantially increased amount of pressure exerted toward the windshield near the ends of the blade by the pressure-transmitting means. That is, with the arm pressure being transmitted through the two pressure points at or adjacent the ends of the blade, the tendency to collapse the rubber in the wiping element in the vicinity of the claws 43 is increased. By thickening the rubber in the vicinity of the end portions of the wiping element, the wiping element is not so likely to be collapsed and the rubber is not so likely to lay over and permit scratching of the windshield.

In the modified form of my invention shown in Figures 9-11, the blade is readily conformed to the surface to be wiped by the combined action of the precurved flexor and the application of arm pressure through the pressure-transmitting means to the end portions of the blade. The stabilizing links 62, 63 slidingly embrace the blade at points intermediate the pressure points on the blade and, since said links are permitted to move only in a plane substantially perpendicular to the windshield surface being wiped, thereby stabilize the said blade against lateral distortion and chatter, and against tortional deflection and deformation.

Therefore, the pressure-transmitting means 12 and the stabilizing links 13, together with the blade (which includes the preshaped flexor 15) combine to produce, when in full assembly, an improved windshield wiper which more readily conforms its blade to surface irregularities in the windshield being wiped.

Regardless of designed irregularities in the contour of the windshield, the subject blade, stabilized against lateral vibration and chatter as well as against torsional deformation and distortion, in certain preferred forms, being without pressure points remote from its ends, gives marked improvement in effectiveness in wiping.

The stabilizing means or links, as described, are particularly advantageous for use with respect to the precurved blade and pressure-transmitting means herein shown, however, it is to be understood that the inventive concept residing in the use and application of the free-floating stabilizing means employed in the subject invention is readily applicable to a windshield wiper assembly in which a medial portion of the blade is of sufficient length, in itself, to make stabilization against chattering and torsional distortion desirable, in forms other than the form herein specifically illustrated. In blades of extreme length it may be desirable to introduce secondary yokes of the type shown in my above-referred-to U.S. Patent No. 2,596,063 for providing one pressure point against the blade adjacent each of the blade extremities with the opposite pressure point of each individual yoke disposed somewhat remote from the extremity of the blade, thus leaving an intermediate span or spans of the blade of sufficient length to utilize to advantage stabilizers such as herein shown and claimed. In other words, the inventive concept reflected in the use of such stabilizers is not limited to any particular pressure-transmitting structure but is useful werever there exists a medial portion of the blade which requires stabilization.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. In a windshield wiper assembly, a flexible wiper blade comprising an elongate resilient wiping element supported by elongate flexible backing means extending substantially along its length, said backing means being normally flexible in a plane substantially perpendicular to a windshield to be wiped thereby and being relatively inflexible in a plane transverse thereto, elongate pressure-transmitting means operatively connected with said blade normally at a plurality of longitudinally spaced relatively movable points thereon for transmitting wiper arm pressure thereto, and stabilizing means interposed between said blade and said pressure-transmitting means and operatively connected therewith for restricting lateral flexing, chatter and torsional deflection of said blade, said stabilizing means having, under normal operating conditions, unimpeded uncushioned movement between said blade and said pressure-transmitting means.

2. In a windshield wiper assembly, a flexible wiper blade comprising an elongate resilient wiping element supported by elongate flexible backing means extending substantially along the length of said wiping element, said blade being normally freely and resiliently flexible throughout the major portion of its length to easily conform smoothly and continuously to the varying contour of a surface to be wiped, pressure-transmitting means operatively connected with said blade for transmitting wiper arm pressure thereto at a plurality of longitudinally spaced relatively movable portions thereof remote from the mid-portion of said blade, and stabilizing means interposed between and operatively and movably connected with said blade and with said pressure-transmitting means for restricting lateral flexing, chatter and torsional deflection of said blade, said stabilizing means having, under normal operating conditions, substantially unimpeded uncushioned movement between said blade and said pressure-transmitting means, whereby to maintain continuous and effective contact between said wiping element and a curved windshield.

3. A wiper for cleaning a nonplanar surface comprising an elongate wiping means being freely and resiliently flexible throughout the major portion of its length to easily conform smoothly and continuously to the varying contour of said surface, elongate pressure-transmitting means substantially coextensive with said wiping means and connected therewith for receiving pressure from a windshield wiper arm and for applying said pressure normally at longitudinally spaced relatively movable points on said wiping means, and a stabilizer member freely pivoted with relation to one of said means for movement substantially in a plane common to the longitudinal axes of said pressure-transmitting means and said wiping means and freely slidably engaging the other of said means, said stabilizer member having substantially unimpeded movement in said plane for stabilizing said wiping means against lateral vibration and chatter and against torsional deformation and distortion.

4. A wiper for cleaning a curved surface, comprising elongate blade means freely resiliently flexible throughout substantially its length in a single plane to easily conform to the varying contour of a surface to be cleaned, elongate pressure-transmitting means substantially coextensive with said blade means and having means for receiving pressure from a wiper arm and means for applying said pressure to a plurality of longitudinally spaced relatively movable portions of the blade means, and an unimpeded stabilizer member interposed between said blade means and said pressure-transmitting means for restricting said blade means against lateral and torsional deflection while permitting deflection of said blade means as the blade means travels across said surface and conforms thereto, said stabilizer member having one of its ends freely pivoted to said pressure-transmitting means and having its other end movably disposed on said blade means to abut opposing abutment means carried by said blade means, whereby to limit longitudinal movement of said blade means relative to said pressure-transmitting means.

5. In a windshield wiper assembly, an elongate wiper blade comprising a wiping element and a substantially coextensive backing means reactively flexible normally in a plane substantially perpendicular to a windshield surface, to conform thereto, and having a predetermined precurvature in the direction of the surface to be wiped to provide against said surface sufficient pressures of said blade for seeking out and wiping effectively irregularities in said surface, wiper arm pressure-transmitting means substantially coextensive with and operatively connected to said blade at longitudinally spaced relatively movable portions thereof, and stabilizing means having portions connected respectively with said blade intermediate said spaced portions and connected with said pressure-transmitting means for stabilizing said blade against lateral vibration, chatter and torsional distortion, said stabilizing means moving freely and unimpeded under normal operating conditions substantially in the plane containing the longitudinal axes of said blade and of said pressure-transmitting means.

6. A windshield wiper blade comprising an elongate resilient wiping element, elongate flexible backing means carrying said wiping element substantially throughout its length and being resiliently and reversely flexible in a plane substantially perpendicular to the surface to be wiped and being substantially inflexible in a plane transverse to said plane, said backing means being precurved outwardly between its extremities in the direction of the surface to be wiped, pressure-transmitting means substantially coextensive with said backing means and with said wiping element and adapted to receive pressure and to apply same to said backing means at longitudinally spaced relatively movable portions thereof, and stabilizing means operatively connected with said pressure-transmitting means and with said backing means to restrain said backing means against lateral and torsional deflection, said stabilizing means having free, unimpeded movement with respect to said pressure-transmitting means and said backing means during relative movement between said pressure-transmitting means and said backing means.

7. A windshield wiper blade comprising an elongate resilient wiping element, elongate flexible backing means extending substantially throughout the length of said wiping element and being freely, resiliently and reversely flexible in a plane substantially perpendicular to a surface to be wiped and being substantially inflexible in a plane substantially parallel to said surface, said backing means being precurved in the direction of the surface to be wiped, elongate pressure-transmitting means substantially coextensive with said wiping element and with said backing means and being adapted to receive pressure and apply it to said backing means at a plurality of longitudinally spaced relatively movable portions thereof, and stabilizing means operatively and movably connected with said pressure-transmitting means and with said backing means whereby to restrain said backing means against lateral and torsional deflection, said stabilizing means comprising at least one member having one portion thereof connected with said pressure-transmitting means and having another portion thereof connected with said backing means, said connections being constructed and arranged to permit substantially free unimpeded movement of said stabilizing means relative to said pressure-transmitting means and said backing means in a plane substantially normal to the windshield, said stabilizing means having stop means for limiting the amount of movement of the backing means away from the pressure-transmitting means.

8. In a wiper for cleaning a nonplanar surface, the combination of a blade having a flexible wiping element and a substantially coextensive backing member therefor, said blade being normally flexible in a direction substantially perpendicular to the surface being wiped and being substantially inflexible in a plane substantially parallel to said surface for smoothly and continuously conforming said blade to varying surface contours, pressure-transmitting means substantially coextensive with said blade and adapted to receive pressure from a windshield wiper arm and to apply said pressure at longitudinally spaced relatively movable portions of said blade, means integral with said flexible wiping element adjacent an extremity thereof for supporting said element against excessive distortion, and stabilizing means operatively connected with said pressure-transmitting means and with said blade for stabilizing said blade against lateral vibration and chatter and against torsional deformation and distortion, said stabilizing means having free and unimpeded movement between said pressure-transmitting means and said blade.

9. In a windshield wiper assembly, a flexible wiper blade comprising an elongate resilient wiping element supported by substantially coextensive elongate flexible backing means, said backing means being normally flexible only in a plane substantially perpendicular to a windshield to be wiped thereby and being relatively inflexible in a plane transverse thereto, elongate pressure-transmitting means substantially coextensive with said wiper blade and slidably and movably connected with said blade at a plurality of longitudinally spaced portions thereof for transmitting wiper arm pressure thereto, and a stabilizing member interposed between said blade and said pressure-transmitting means for restricting lateral flexing, chatter and distortion of said blade, said stabilizing member having one of its extremities pivotally carried by, and freely movable with relation to, said pressure-transmitting means substantially in a plane common to the longitudinal axis of said blade and of said pressure-transmitting means, the other extremity of said stabilizing member being provided with means for engaging said backing means in embracing relationship thereto and being freely slidably movable longitudinally thereon, said stabilizing member having, under normal operating conditions and coactive with said backing means, substantially unimpeded uncushioned movement toward and from said pressure-transmitting means.

References Cited in the file of this patent

UNITED STATES PATENTS

| 2,706,291 | Rappl | Apr. 12, 1955 |
| 2,767,419 | Horton | Oct. 23, 1956 |
| 2,772,436 | Deibel | Dec. 4, 1956 |
| 2,782,445 | Krohm | Feb. 26, 1957 |
| 2,814,821 | Wallis | Dec. 3, 1957 |
| 2,821,732 | Scinta | Feb. 4, 1958 |

FOREIGN PATENTS

| 755,120 | Great Britain | Aug. 15, 1956 |
| 1,033,521 | France | Apr. 1, 1953 |
| 1,062,783 | France | Dec. 9, 1953 |

UNITED STATES PATENT OFFICE

CERTIFICATE OF CORRECTION

Patent No. 2,920,336                      January 12, 1960

John W. Anderson

It is hereby certified that error appears in the printed specification of the above numbered patent requiring correction and that the said Letters Patent should read as corrected below.

Column 3, line 3, after the syllable "scribed" insert a comma; line 55, for "an adjacent" read -- and adjacent --; column 4, line 65, for "under-engaging" read -- underengaging --; line 68, for "(or '"flexor")" read -- (or"flexor") --; column 5, line 17, for "rubber-like" read -- rubberlike --; lines 25, 35 and 72, for "elongated", each occurrence, read -- elongate --; column 7, line 6, for "facilities" read -- facilitates --; column 8, line 64, for "tortional" read -- torsional --; column 9, line 25, for "werever" read -- wherever --.

Signed and sealed this 21st day of June 1960.

(SEAL)
Attest:

KARL H. AXLINE
Attesting Officer

ROBERT C. WATSON
Commissioner of Patents